United States Patent
Kim et al.

(10) Patent No.: US 8,230,503 B2
(45) Date of Patent: Jul. 24, 2012

(54) METHOD OF EXTRACTING WINDOWS EXECUTABLE FILE USING HARDWARE BASED ON SESSION MATCHING AND PATTERN MATCHING AND APPARATUS USING THE SAME

(75) Inventors: Byoung Koo Kim, Daejeon (KR); Seung Yong Yoon, Daejeon (KR); Ik Kyun Kim, Daejeon (KR); Jin Tae Oh, Daejeon (KR); Jong Soo Jang, Daejeon (KR); Hyun Sook Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 393 days.

(21) Appl. No.: 12/503,288

(22) Filed: Aug. 17, 2009

(65) Prior Publication Data
US 2010/0146621 A1 Jun. 10, 2010

(30) Foreign Application Priority Data
Dec. 10, 2008 (KR) .......................... 10-2008-0125415

(51) Int. Cl.
*H04L 29/06* (2006.01)

(52) U.S. Cl. ............................................ 726/22; 726/24
(58) Field of Classification Search ................ 726/22–25
See application file for complete search history.

(56) References Cited

U.S. PATENT DOCUMENTS

| 2009/0013405 A1* | 1/2009 | Schipka | ......................... 726/22 |
| 2009/0328219 A1* | 12/2009 | Narayanaswamy | ............ 726/23 |

* cited by examiner

*Primary Examiner* — Edward Zee
(74) *Attorney, Agent, or Firm* — Nelson Mullins Riley & Scarborough LLP; EuiHoon Lee, Esq.

(57) ABSTRACT

A method and apparatus for extracting a windows executable file that can search for a pattern related to windows executable files among a large quantity of network packets using a hardware-based session tracking and pattern matching technology and that can extract all packets included in the corresponding session are provided. The method of extracting a windows executable file includes: collecting incoming packets having a payload according to a session of a reference packet having an MZ pattern; performing a portable executable (PE) pattern matching for the collected incoming packets; and forming a PE file based on at least one incoming packet satisfying the PE pattern matching.

8 Claims, 8 Drawing Sheets

METHOD OF EXTRACTING WINDOWS EXECUTABLE FILE USING HARDWARE BASED ON SESSION MATCHING AND PATTERN MATCHING AND APPARATUS USING THE SAME

CROSS-REFERENCE TO RELATED APPLICATION

This application claims priority from Korean Patent Application No. 10-2008-0125415 filed on Dec. 10, 2008 in the Korean Intellectual Property Office, the disclosure of which is incorporated herein by reference in its entirety.

BACKGROUND OF THE INVENTION

1. Field of the Invention

The present invention relates to a method and apparatus for extracting windows executable files of a complete form in an environment of a high speed network having a large capacity, and more particularly, to a method and apparatus for extracting windows executable files that can search for a pattern related to windows executable files among a large quantity of network packets using a hardware-based session tracking and pattern matching technology and that can extract all packets included in the corresponding session.

The present invention is obtained from a research for an IT growth power technology development business of Ministry of Knowledge and Economy [subject management number: 2006-S-042-03, a subject title: development for a real-time attack signature generation and management technology for coping to zero-day attack of network threat].

2. Description of the Related Art

Computer viruses have been variously developed from viruses for infecting files to worms for rapidly spreading through a network, and to Trojan horses for stealing data. A threat of viruses and malwares for a network has been increased and infection of files due to viruses and malwares and hacking techniques of files have been developed. Therefore, various countermeasures have been actively researched to protect a computer system from a threat of viruses and malwares for a network.

Most known anti-virus programs use a file-based diagnosis method. The file-based diagnosis method diagnoses a virus or a malware using a specified type signature and is called a signature-based diagnosis method or a string-based diagnosis method.

Because the signature-based diagnosis method scans only a specific portion or an intrinsic portion of a file classified into malware as a scan target, the signature-based diagnosis method can minimize erroneous detection and non-detection. Further, when an anti-virus program scans a file, the anti-virus program compares only specific portions of scan target files with a signature, whereby scanning can be rapidly performed. However, the signature-based diagnosis method can cope with only already-known viruses and cannot cope with new type viruses.

One of detection methods developed to overcome a limitation of the signature-based diagnosis method is a heuristic detection method. The heuristic detection method diagnoses a file using an action pattern of virus or malware. For example, when any file records data in a specific folder, when any file changes a specific registry, or when any file uses an instruction in which virus or malware frequently uses, the heuristic detection method diagnoses the file as viruses or malware. Therefore, the heuristic detection method regards an action of recording data at a specific folder, an action of changing a specific registry, or an action of using a specific instruction as a signature and compares the signature with instructions of a scan target file.

The heuristic detection method is classified into a method of executing a file in a virtual operating system (OS) and a method of scanning and comparing files without executing the file. Further, the heuristics detection method may detect virus or malware by comparing operation codes (OPcode) of files using an OPcode instruction for a common code section of virus code files as a signature.

As described above, an analysis for an execution file is an element necessary for rapidly coping while performing efficient detection for various viruses. However, most malware (or virus) detection techniques using various file analysis techniques require a complete execution file and are commonly performed in a host computer. That is, the techniques have a structure of analyzing files executed within the host computer. Therefore, the techniques have a limitation in analyzing and dealing executable files transferred in an environment of a high speed network having a large capacity at early stages.

SUMMARY OF THE INVENTION

The present invention has been made in an effort to solve the above problems, and the present invention provides an apparatus and method for extracting windows executable file that can be performed through a hardware-based apparatus and provide a base for forming a portable executable file by combining reception packets in a network environment of a high speed referring to characteristics of a PE file executed in a windows-based operating system.

The present invention further provides an apparatus and method for extracting windows executable file that can be applied with the same method to other operating systems as well as to a Microsoft Windows operating system because of using a hardware-based high speed pattern matching technology and a hash-based session matching technology.

According to an aspect of the present invention, there is provided a method of extracting a windows executable file, including: collecting incoming packets having a payload according to a session of a reference packet having an MZ pattern; performing a portable executable (PE) pattern matching for the collected incoming packets; and forming a PE file based on at least one incoming packet satisfying the PE pattern matching.

According to another aspect of the present invention, there is provided an apparatus for extracting a windows executable file, including: a session matching module for collecting incoming packets having the same session as that of the reference packet based on a session of the reference packet having an MZ pattern; a pattern matching module for performing PE pattern matching for the collected incoming packets; and a PE processing module for forming a PE file by combining at least one incoming packet satisfying the PE pattern matching.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

Figure 1:
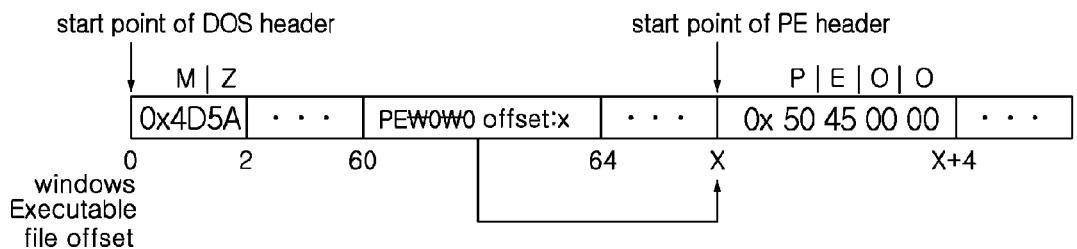
FIG. 1 is a block diagram illustrating a structure of a windows executable file.

FIG. 1 a block diagram illustrating a structure of a windows executable file.

A windows executable file (portable executable file) (hereinafter, referred to as a 'PE file') described in the present invention starts from MZ (0x4D54), which is a 2-byte string of a DOS header. 4-bytes from a point in which a PE file offset is 60 have an offset value for a PE header start point of a PE file. That is, as shown in FIG. 1, if an offset value is X, a PE header starts from a point at which an offset of the PE file is X, and first 4 bytes start from a string, which is PE$\overline{W0}\overline{W0}$ (0x50450000). A structure of a PE file has the same characteristics in all PE files.

FIGS. 2 to 5 are diagrams illustrating a method of extracting a PE file according to a packet pattern.

Figure 2:
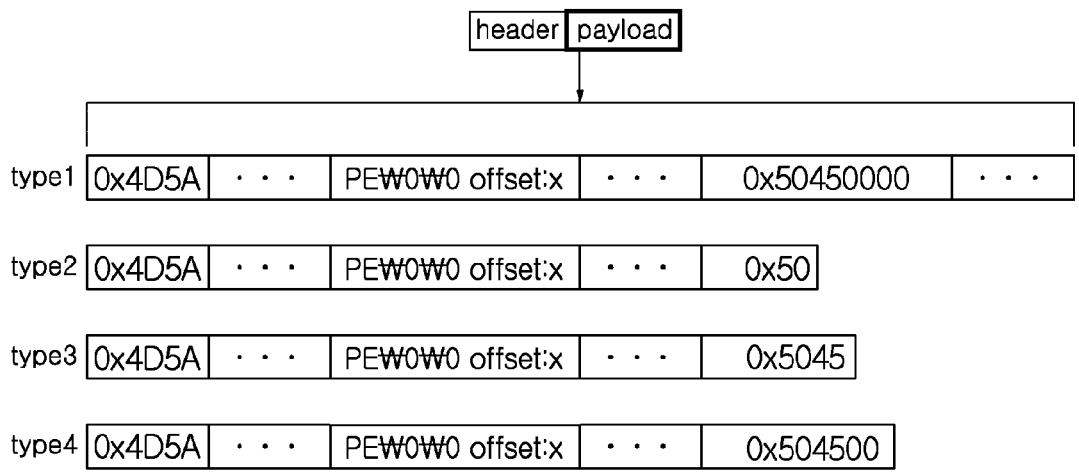
FIGS. 2, 3, 4, and to 5 are diagrams illustrating a method of extracting a PE file according to a packet pattern.

FIG. 2 illustrates a case where characteristics of all PE files are shown within a packet payload.

Packets corresponding to type 1, type 2, type 3, and type 4 illustrate a case where a PE$\overline{W0}\overline{W0}$ string is appeared at a point at which an offset of the PE file is X after an MZ string is appeared in the packet. The packet corresponding to type 1 is a packet including all PE$\overline{W0}\overline{W0}$ strings, the packet corresponding to type 2 is a packet in which a last byte (hereinafter, last P) of a packet payload is P, the packet corresponding to type 3 is a packet in which last two bytes are PE (hereinafter, last PE), and the packet corresponding to type 4 is a packet in which last three bytes are PE$\overline{W0}$ (hereinafter, last PE$\overline{W0}$). In packet patterns represented in type 1 to type 4, when characteristics of all PE files are represented within one packet payload (hereinafter, an MZ-PE$\overline{W0}\overline{W0}$ pattern), the PE file is extracted by collecting all packets of the corresponding session.

Figure 3:
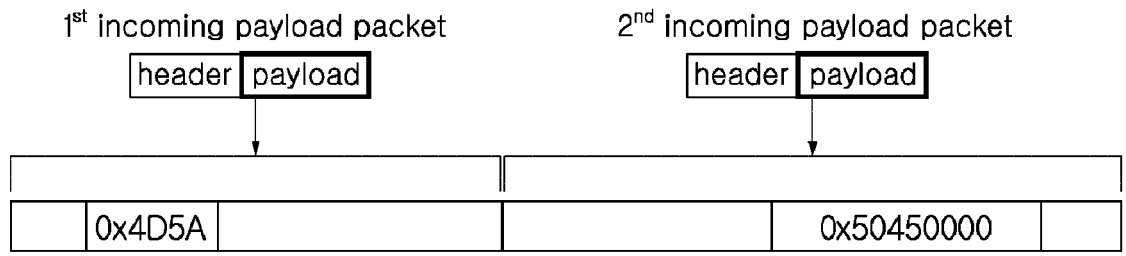
Figure 4:
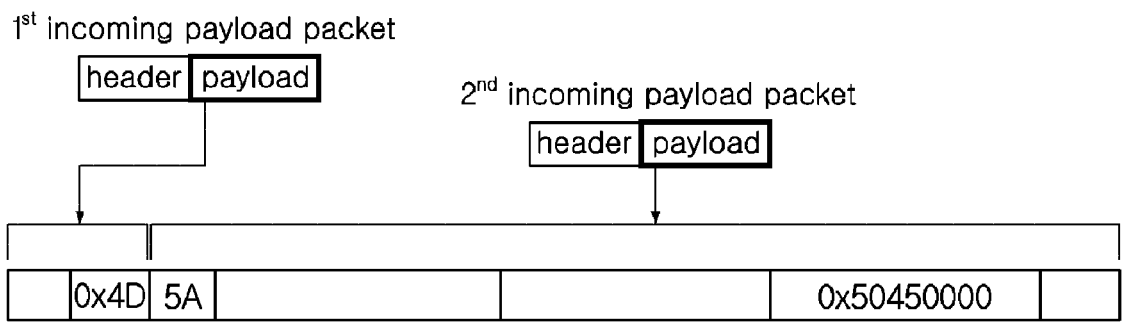

FIGS. 3 and 4 illustrate a case where characteristics of a PE file are appeared within a payload over two packets.

FIG. 3 illustrates a case where an MZ string is appeared within a payload of a first packet (incoming payload packet 1) and a PE$\overline{W0}\overline{W0}$ string is appeared within a payload of a second packet (incoming payload packet 2). A packet pattern in which a PE$\overline{W0}\overline{W0}$ string is appeared within a payload of a second packet is a packet including all PE$\overline{W0}\overline{W0}$ strings, as in type 1 of FIG. 2, and is a packet of a last P pattern, a last PE pattern, and a last PE$\overline{W0}$ pattern corresponding to type 2, type 3, and type 4, respectively (hereinafter, a last P pattern, a last PE pattern, and a last PE$\overline{W0}$ pattern are referred to as a 'PE$\overline{W0}\overline{W0}$ pattern').

FIG. 4 illustrates a case where a last byte is M (hereinafter, last M) in a payload of the first packet (incoming payload packet 1) and a case where a character Z and a PE$\overline{W0}\overline{W0}$ pattern are appeared in a payload of the second packet (incoming payload packet 2).

The MZ string shown in FIG. 4 is divided into various packets and disposed, as in the PE$\overline{W0}\overline{W0}$ string shown in FIG. 3. When the MZ string is divided and disposed at two different packets (incoming payload packet 1 and incoming payload packet 2), a packet including all MZ string and a packet of the last M are appeared according to a dividing point of the MZ string. When combining PE packets, the order of combining packets is determined according to whether the MZ string is disposed at which packet in which order. In order for a network device (or a host) to find a MZ string at a packet, the network device should have the MZ string, and in the present invention, it is called an MZ pattern.

If a MZ pattern is appeared at a first packet and a PE$\overline{W0}\overline{W0}$ pattern is appeared at a second packet, a session of the first packet is a corresponding session and a PE file can be extracted from a packet injected after the first packet.

Figure 5:
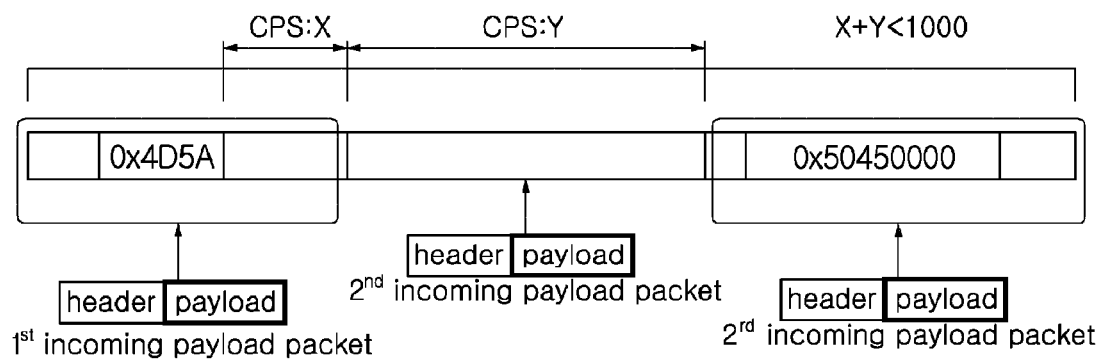

FIG. 5 illustrates a case where characteristics of the PE file appear are appeared within the packet payload over several packets. FIG. 5 illustrates a case where an MZ pattern is appeared within the payload of the first packet and a packet having a PE$\overline{W0}\overline{W0}$ pattern is injected after injection of several packets.

In this case, when a payload size is not over 1000 until a PE pattern is appeared after the MZ pattern is appeared, the PE file can be extracted by collecting all packets of the corresponding session. This is because an offset indicating a PE header of most PE files is less than 1000. Further, collection of unnecessary packets can be greatly reduced by using characteristics in which an offset is less than 1000. In FIG. 5, a value X of a captured packet size (CPS) indicates a payload size after the MZ pattern of a packet in which the MZ pattern is appeared, and a value Y of another CPS indicates a payload size of packets injected after the MZ pattern is appeared. That is, payload sizes before a packet representing the PE$\overline{W0}\overline{W0}$ pattern is injected are added and if the sum of the payload sizes is less than a CPS threshold value (for example, 1000), previous packets are determined as a packet of a session in which the PE file is included.

Figure 6:
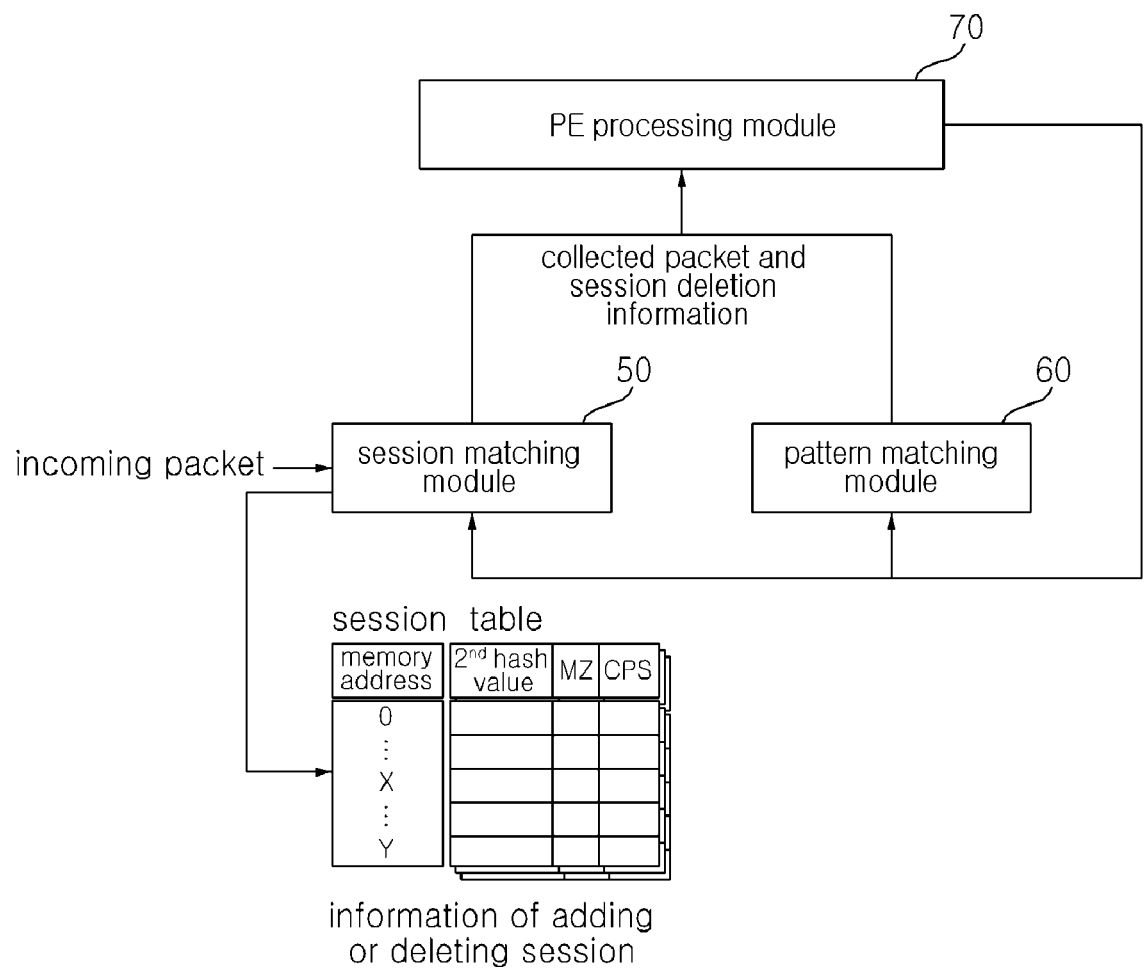
FIG. 6 is a block diagram of a windows executable file extracting apparatus for extracting PE files from packets injected from a network.

FIG. 6 is a block diagram of a PE file extraction apparatus for extracting PE files from packets injected from a network.

The PE file extraction apparatus includes a session matching module 50, a pattern matching module 60, and a PE processing module 70.

The session matching module 50 sets a packet having an MZ pattern as a reference packet and collects incoming packets having a payload according to a session of the reference packet. The session matching module 50 performs session matching based on 5-tuple information of the reference packet. The 5-tuple information is information about a source address, a destination address, a source port, a destination port, and a protocol of a packet injected to the session matching module 50. If a packet no having the same 5-tuple information as that of the reference packet is injected, the session matching module 50 sends the packet to the pattern matching module 60.

The pattern matching module 60 searches for and compares an MZ pattern, a PE$\overline{W0}\overline{W0}$ pattern, and an MZ-PE$\overline{W0}\overline{W0}$ pattern, which are PE file characteristics with respect to the packet sent by the session matching module 50.

5-tuple information of the packet in which the above-described pattern is found is registered at a session table, and a packet registered at the session table is sent to the PE processing module 70. Here, in session information registered at the session table, a memory address (X) to be stored is determined according to a first hash value, and a second hash value for the session information of the registered packet, an MZ session or not, and a CPS value are stored at the session table. Here, the first hash value and the second hash value are determined by a hash function having a few hash collisions. When the second hash value collides with the first hash value, a hash collision is minimized by using a session table copied for the second hash value. Session matching using a hash value allows to perform session matching in a high speed. A bit shown in FIG. 6 is a bit for representing whether an MZ session exists and is a bit corresponding to a case where the MZ pattern is appeared and the PE W0 W0 pattern is not appeared at the incoming packet.

Figure 7:
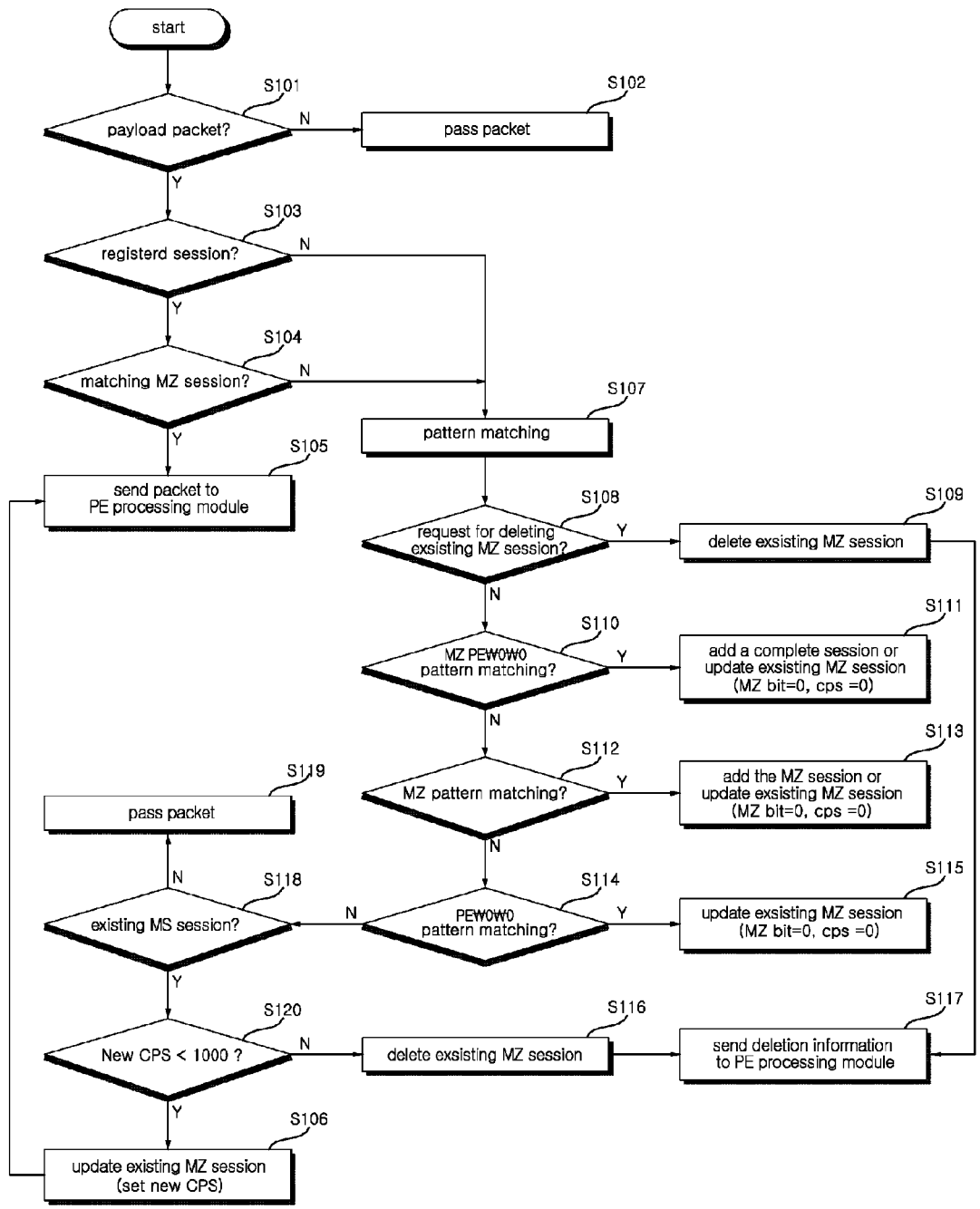
FIG. 7 is a flowchart illustrating a method of collecting packets through a session matching module.

FIG. 7 is a flowchart illustrating a method of collecting packets through the session matching module.

The session matching module 50 determines whether an incoming packet is a packet having a payload (S101).

If an incoming packet is a packet having no payload, the session matching module 50 passes the incoming packet without any action (S102). If an incoming packet is a packet having a payload, the session matching module 50 determines whether the incoming packet is a packet having a session registered at the session table (S103). In this case, the session matching module 50 compares 5-tuple information of the incoming packet with 5-tuple information registered at the session table and determines whether the 5-tuple information of the incoming packet matches with the 5-tuple information (secession information) registered at the session table.

If the 5-tuple information of the incoming packet does not match the 5-tuple information registered at the session table, the session matching module 50 sends the incoming packet to the pattern matching module 60.

If the 5-tuple information of the incoming packet matches with the 5-tuple information registered at the session table, the session matching module 50 determines whether the incoming packet is a packet having an MZ session (session registered by MZ pattern matching and session in which an MZ information bit is 1) (S104).

If the session of the incoming packet is a packet having no MZ session (after MZ pattern matching, a session in which a PE W0 W0 pattern is appeared, or a session generated by an MZ-PE W0 W0 pattern and a session in which an MZ information bit is 0 and hereinafter, referred to as a "complete session"), the session matching module 50 sends the incoming packet to the pattern matching module 60 in order to combine PE files of the incoming packet and the pattern matching module 60 performs pattern matching of the incoming packet that has an unregistered session, or that does not correspond with the MZ session (S107). If the incoming packet is a packet having an MZ session, the session matching module 50 sends the incoming packet to the PE processing module 70 (S105)

The session matching module 50 determines whether to delete an existing MZ session included in the incoming packet according to whether the existing MZ session is related to a combination of the PE files by the pattern matching (S108).

If the existing MZ session is not related to a combination of the PE files, the session matching module 50 deletes the existing MZ session (S109) and notifies the PE processing module 70 of deletion information (S117). By deleting MZ session information unrelated to a combination of the PE files, the session matching module 50 can avoid an unnecessary session combination.

If deletion of an existing MZ session is unnecessary, the session matching module 50 determines whether the incoming packet matches with an MZ-PE W0 W0 pattern of the session table (S110).

If the incoming packet matches with an MZ-PE W0 W0 pattern of the session table, the session matching module 50 adds the complete session (session in which an MZ information bit and a CPS information value are 0) to session information of the incoming packet and if the existing MZ session exists in the incoming packet, the corresponding session information is updated in a complete session form (S111). If the incoming packet does not match with an MZ-PE W0 W0 pattern of the session table, the session matching module 50 determines whether the incoming packet matches with the MZ pattern (S112).

If the incoming packet matches with the MZ pattern, the session matching module 50 adds an MZ session (session in which an MZ information bit value is 1 and in which a CPS information value is set as a payload size after the MZ pattern) to the session information of the incoming packet and if the existing MZ session exists in the incoming packet, the session matching module 50 updates the CPS information value as a new MZ session starts (S113). If the incoming packet does not match with the MZ pattern, the session matching module 50 determines whether the incoming packet matches with a PE W0 W0 pattern (S114).

If the incoming packet matches with a PE W0 W0 pattern, the session matching module 50 updates the existing MZ session included in the incoming packet to a complete session form (S115). If the incoming packet does not match with a PE W0 W0 pattern, the session matching module 50 determines whether the existing MZ session exists in the incoming packet (S118).

If the existing MZ session exists in the incoming packet, the session matching module 50 compares a new CPS value in which a CPS value of the MZ session and a payload size of the incoming packet are added with a maximum allowable CPS value (1000) and determines whether the new CPS value is less than 1000 (S120).

If the new CPS value is less than 1000, the session matching module 50 updates the existing MZ session and sets the new CPS value (S106) and the session matching module 50 sends the incoming packet to the PE processing module 70. If the new CPS value is equal to or greater than 1000, the session matching module 50 deletes the existing MZ session (S116) and sends deletion information in the session table to the PE processing module 70.

If the existing MZ session does not exist in the incoming packet at step S118, the session matching module 50 passes the incoming packet without any action. (S119)

Figure 8:
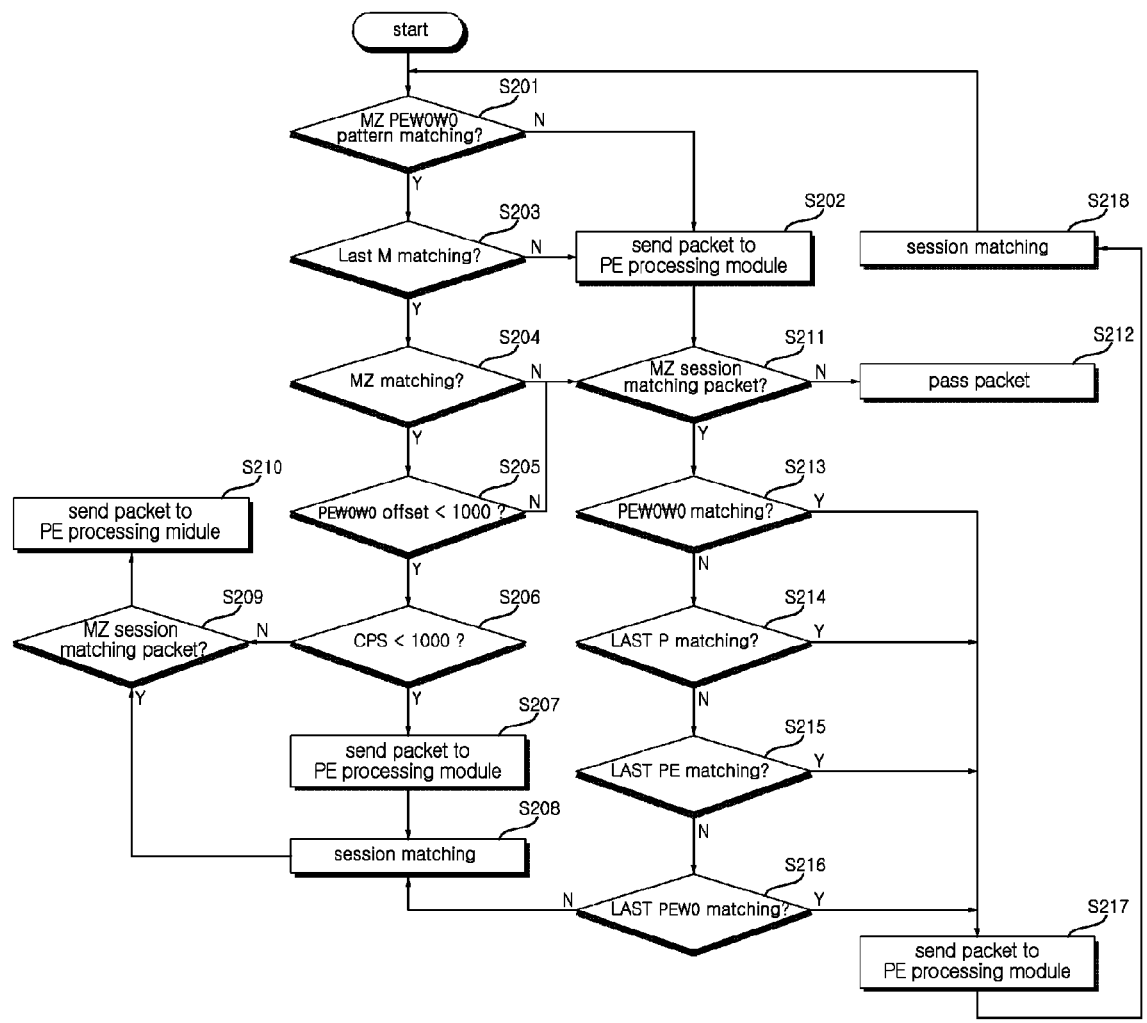
FIG. 8 is a flowchart illustrating operation of the pattern matching module of FIG. 6.

FIG. 8 is a flowchart illustrating operation of the pattern matching module 60 of FIG. 6.

The pattern matching module 60 determines whether the payload of the incoming packet provided from the session matching module 50 includes the MZ-PE W0 W0 pattern (S201).

If the payload of the incoming packet provided from the session matching module 50 does not include the MZ-PE W0 W0 pattern, the pattern matching module 60 sends the incoming packet to the PE processing module 70 (S202) and sends matching information (information for registering a complete session) to the session matching module 50. If the payload of the incoming packet provided from the session matching module 50 includes the MZ-PE W0 W0 pattern, the pattern matching module 60 determines whether the incoming packet matches with a last M pattern (S203).

If the incoming packet does not match with a last M pattern, the pattern matching module 60 sends the incoming packet to the PE processing module 70. If the incoming packet matches with a last M pattern, the pattern matching module 60 sends matching information (information for registering a complete session) to the session matching module 50 and determines whether the incoming packet matches with an MZ session (S204).

If the incoming packet matches with an MZ session, the pattern matching module 60 determines whether a PE header offset value (value of 60 to 63 bytes from a start point of the PE file) of a PE file within the payload is less than 1000 (S205).

If a PE header offset value of a PE file within the payload is equal to or greater than 1000, the pattern matching module 60 determines whether the incoming packet matches with an MZ session (S211). If a PE header offset value of a PE file within the payload is less than 1000, the pattern matching module 60 determines whether a CPS value, which is a payload size after MZ matching is less than an allowable threshold value (1000) (S206).

If a CPS value is less than an allowable threshold value (1000), the pattern matching module 60 sends the incoming packet provided from the session matching module 50 to the PE processing module 70 (S207) and returns the matching information (information for registering MZ session) for the incoming packet to the session matching module 50. Here, comparison of a PE header offset value of a PE file is performed only when the offset value is within a payload after MZ pattern matching. The pattern matching module 60 determines whether the incoming packet matches with the MZ session (S209). If the incoming packet matches with the MZ session, the pattern matching module 60 performs session matching, i.e. sends a deletion request of the existing MZ session included in the incoming packet to the session matching module 50 (S208). If the incoming packet does not match with the MZ session, the pattern matching module 60 sends the incoming packet to the PE processing module 70 (S210).

If the incoming packet does not match with an MZ session at step S204, the pattern matching module 60 determines whether the incoming packet matches with an MZ session (S211).

If the incoming packet matches with an MZ session, the pattern matching module 60 determines whether the incoming packet matches with PE₩0₩0 pattern (S213). If the incoming packet does not match with an MZ session, the pattern matching module 60 passes the incoming packet without any action (S212).

If the incoming packet does not match with a PE₩0₩0 pattern, the pattern matching module 60 determines whether the incoming packet matches with a last P pattern (S214).

If the incoming packet does not match with a last P pattern, the pattern matching module 60 determines whether the incoming packet matches with a last PE pattern (S215).

If the incoming packet does not match with a last PE pattern, the pattern matching module 60 determines whether the incoming packet matches with a last PE₩0 pattern (S216). If the incoming packet matches with a PE₩0₩0 pattern, a last P pattern, a last PE pattern, or a last PE₩0 pattern, the pattern matching module 60 sends the incoming packet to the PE processing module 70 (S217) and sends matching information (information for updating the existing MZ session to a complete session) to the session matching module 50 (S218). If the incoming packet does not match with a last PE₩0 pattern at step S216, the pattern matching module 60 performs session matching (S208). In this case, the pattern matching module 60 measures a CPS value using matching information (information for updating the existing MZ session) of the incoming packet and provides the CPS value to the session matching module 50.

Through operation of the hardware-based session matching module 50 and pattern matching module as in FIGS. 7 and 8, PE files that are divided into several packets and transferred can be extracted in an environment of a large capacity network of a high speed.

Figure 9:
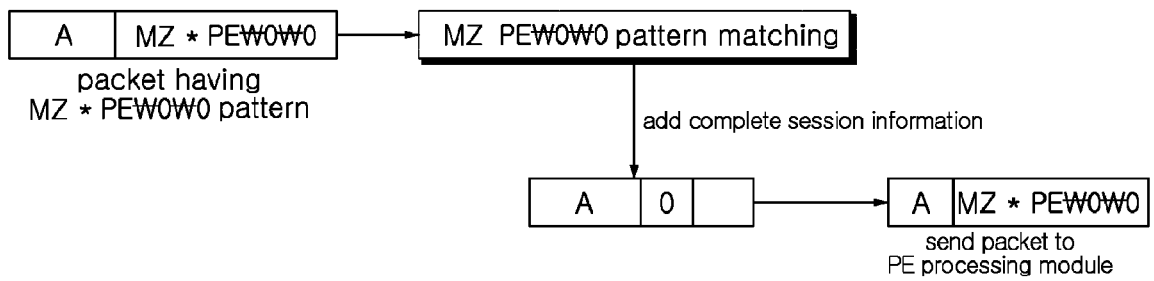
FIG. 9 is a diagram illustrating a case where another packet unrelated to characteristics of a PE file is injected to a session in which a packet having an MZ-PE$\overline{W0}\overline{W0}$ pattern is included after the packet is injected.
Figure 10:
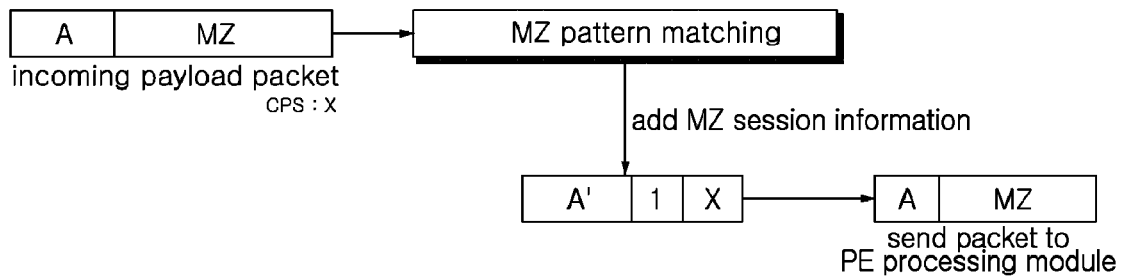
FIGS. 10 and 11 are diagrams illustrating a case where a packet having a PE$\overline{W0}\overline{W0}$ pattern is injected to a session in which a packet having an MZ pattern is included after the packet is injected.
Figure 11:
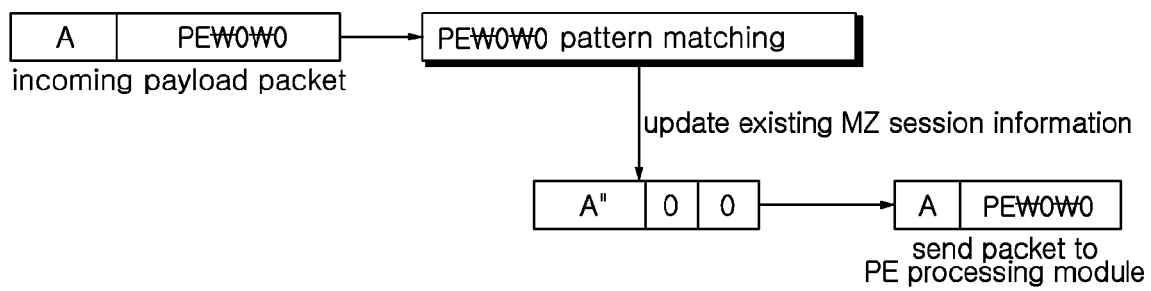

FIGS. 9, 10, and 11 illustrate a method in which session matching and packet matching are performed when a PE file is injected to actual network packets according to the above-described operation principle. Here, each illustration is started by injection of a packet in a state where there is no registered session. A designates session information of incoming packet, A' designates a first hash value of the corresponding session information, and A'' designates a second hash value of the corresponding session information. That is, A' designates a memory address of a session table in which the corresponding session information is stored.

FIG. 9 illustrates a case where another packet (hereinafter, a second packet) unrelated to characteristics of a PE file is injected to a session in which a packet (hereinafter, a first packet) having an MZ-PE₩0₩0 pattern is included after the first packet is injected. In the first packet, session matching does not occur and as a result of pattern matching, an MZ-PE₩0₩0 pattern is found, and thus session information of the first packet is registered at a session table as a complete session in which an MZ information bit is 0. The first packet is sent to the PE processing module 70. Next, when the second packet is injected, session information of the second packet is matched to a complete session of a registered session table by the first packet. Because an MZ information bit of the corresponding session is 0, pattern matching is no longer necessary, and the second packet is also sent to the PE processing module 70. That is, when a complete session is registered at the session table through pattern matching, all packets included in the corresponding session are sent to the PE processing module 70. The complete session is deleted when a combination of PE files is completed by the PE processing module 70, or when it is determined that a file is not a PE file by combining the corresponding packets.

FIGS. 10 and 11 illustrate a case where a packet (hereinafter, a fourth packet) having a PE₩0₩0 pattern is injected to a session in which a packet (hereinafter, a third packet) having an MZ pattern is included after the third packet is injected. In the third packet, session matching does not occur and as a result of pattern matching, an MZ pattern is found, and thus session information of the third packet is registered at a session table as an MZ session in which an MZ information bit is 1 and a CPS value is X (X<1000). Here, MZ pattern matching is last M matching, however if a session is registered by MZ matching of last 2 bytes, a value of X is 0. The third packet is sent to the PE processing module 70. Next, when the fourth packet is injected, session information of the fourth packet is matched to MZ session of a registered session table by the third packet. The MZ session matching requires pattern matching of the fourth packet, and as a result of the pattern matching, a PE₩0₩0 pattern is found. Therefore, existing MZ session information registered at the session table is updated to a complete session in which the MZ information bit is 0, and the fourth packet is also sent to the PE processing module 70. In such a way, even when the complete session is registered at the session table, all packets included in the corresponding session are sent to the PE processing module 70.

Figure 12:
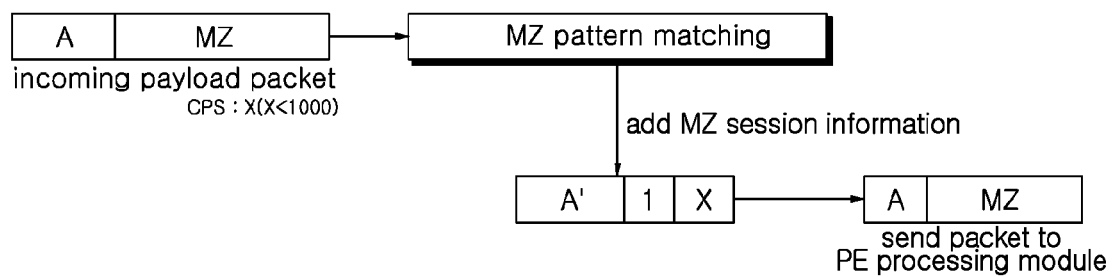
FIGS. 12 and 13 are diagrams illustrating a case where another packet unrelated to characteristics of a PE file is injected to a session in which a packet having an MZ pattern is included after the packet is injected.
Figure 13:
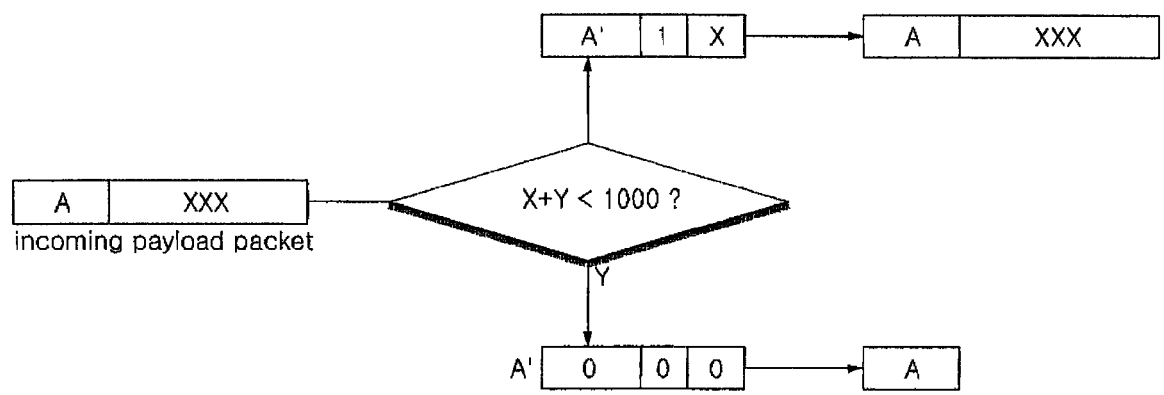

FIGS. 12 and 13 illustrate a case where another packet (hereinafter, a sixth packet) unrelated to characteristics of a PE file is injected to a session in which a packet (hereinafter, a fifth packet) having an MZ pattern is included after the fifth packet is injected. In the fifth packet, the fifth packet is processed with the same way as the third packet of FIG. 10. Next, when the sixth packet is injected, session information of the sixth packet is matched to MZ session of the registered session table by the fifth packet. The MZ session matching requires pattern matching for the sixth packet, and as a result of pattern matching, because a pattern having characteristics of a PE file is not found, a CPS value Y, which is a payload size of the sixth packet is generated. If the sum Z of the generated CPS value Y and a CPS value X included in the existing MZ session information is less than an allowable value 1000, a CPS value of the existing MZ session information registered at a session table is updated to Z, and the sixth packet is also sent to the PE processing module 70. If the sum Z of the CPS value is equal to or greater than 1000, all existing MZ session information registered at the session table is reset to 0, and deleted session information is sent to the PE processing module 70. In a method according to the present invention, because a PE file is determined and processed with a hardware-based extraction method, a load of software for combining the PE files can be minimized.

As described above, according to the present invention, because a PE file can be analyzed earlier than a host by extracting a PE file in a packet before a packet is injected to the host, various file analysis techniques can be previously applied to the extracted PE file, thereby extracting viruses, worms, and Trojan horses at early stages.

Further, PE files can be extracted in an environment of a large capacity of network of a high speed.

Further, only packets related to PE files among a large quantity of network packets are extracted.

Further, PE files can be extracted from the packets transmitted to a host while hardly affecting performance of the host or a network equipment of a high speed.

The embodiment of the invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of extracting a windows executable file, comprising:
    collecting incoming packets having a payload according to a session of a reference packet having an MZ pattern;
    performing a portable executable (PE) pattern matching for the collected incoming packets; and
    forming a PE file based on at least one incoming packet satisfying the PE pattern matching;
    wherein the collecting of incoming packets comprises comparing 5-tuple information of the reference packet and 5-tuple information of the at least one incoming packet.

2. The method of claim 1, wherein the reference packet is formed by combining at least one neighboring packets.

3. The method of claim 1, wherein the forming of a PE file comprises, if a size of a payload between the MZ pattern and the PE pattern is within a preset reference value, combining incoming packets included within the payload.

4. The method of claim 1, wherein the collecting of incoming packets comprises deleting an incoming packet in response to determining that the incoming packet does not match with the 5-tuple information of the reference packet and in response to determining that a payload of the incoming packet does not exist.

5. A processor for extracting a windows executable file, the processor comprising modules embodied in a non-transitory computer readable medium, the modules comprising:
    a session matching module for collecting incoming packets having the same session as that of a reference packet based on a session of the reference packet having an MZ pattern;
    a pattern matching module for performing PE pattern matching for the collected incoming packets; and
    a PE processing module for forming a PE file by combining at least one incoming packet satisfying the PE pattern matching;
    wherein the session matching module compares 5-tuple information of the reference packet and 5-tuple information of the at least one incoming packet.

6. The processor of claim 5, wherein the reference packet is formed by combining at least one neighboring packet.

7. The processor of claim 5, wherein the PE processing module forms the PE file by combining the incoming packets included within the payload, if a size of a payload between the MZ pattern and the PE pattern is within a preset reference value.

8. The processor of claim 5, wherein the session matching module deletes an incoming packet in response to determining that the incoming packet does not match with the 5-tuple information of the reference packet and in response to determining that a payload of the incoming packet does not exist.

* * * * *